United States Patent
Zhu et al.

(10) Patent No.: US 10,767,239 B2
(45) Date of Patent: Sep. 8, 2020

(54) PRODUCTION METHOD FOR SMELTING CLEAN STEEL FROM FULL-SCRAP STEEL USING DUPLEX ELECTRIC ARC FURNACES

(71) Applicants: University of Science and Technology Beijing, Beijing (CN); Tangshan first Tang Baosheng functional materials Co., Ltd., Tangshan (CN)

(72) Inventors: Rong Zhu, Beijing (CN); Guangsheng Wei, Beijing (CN); Tianping Tang, Beijing (CN); Kai Dong, Beijing (CN); Liangxin Zhao, Beijing (CN); Xuetao Wu, Beijing (CN); Fengwu Chen, Beijing (CN)

(73) Assignees: UNIVERSITY OF SCIENCE AND TECHNOLOGY BEIJING, Beijing (CN); TANGSHAN FIRST TANG BAOSHENG FUNCTIONAL MATERIALS CO., LTD., Tangshan (CN)

( * ) Notice: Subject to any disclaimer, the term of this patent is extended or adjusted under 35 U.S.C. 154(b) by 320 days.

(21) Appl. No.: 15/959,230

(22) Filed: Apr. 22, 2018

(65) Prior Publication Data
US 2018/0363077 A1    Dec. 20, 2018

Related U.S. Application Data

(63) Continuation of application No. PCT/CN2017/107291, filed on Oct. 23, 2017.

(30) Foreign Application Priority Data

Jun. 16, 2017  (CN) .......................... 2017 1 0456056

(51) Int. Cl.
*C21C 7/064* (2006.01)
*C21C 5/52* (2006.01)
(Continued)

(52) U.S. Cl.
CPC ................ *C21C 7/064* (2013.01); *C21C 5/30* (2013.01); *C21C 5/5217* (2013.01);
(Continued)

(58) Field of Classification Search
CPC ..... C21C 5/5217; C21C 5/5252; C21C 5/562; C21C 7/0025; C21C 7/0037; C21C 7/064; C21C 7/068; C21C 2007/0093
See application file for complete search history.

(56) References Cited

U.S. PATENT DOCUMENTS

| 5,868,817 A * | 2/1999 | Yano ......................... C21C 1/02 148/500 |
| 2019/0048430 A1* | 2/2019 | Zhu ....................... C21C 7/0025 75/528 |

FOREIGN PATENT DOCUMENTS

| CN | 1134984 A | 11/1996 |
| CN | 1373229 A | 10/2002 |

(Continued)

OTHER PUBLICATIONS

KR 2017019530 A Machine Translation of the Description (Year: 2017).*

(Continued)

*Primary Examiner* — Tima M. McGuthry-Banks
(74) *Attorney, Agent, or Firm* — Bayramoglu Law Offices LLC

(57) ABSTRACT

A production method for smelting clean steel from full-scrap steel using duplex electric arc furnaces. Electric arc furnaces located in two positions are connected in series, wherein the electric arc furnace in a first position is dephosphorization
(Continued)

electric arc furnace, and the electric arc furnace in a second position is a decarbonization electric arc furnace. The production method includes: performing smelting by combining a decarbonization electric arc furnace and 1-3 dephosphorization electric arc furnaces; a specific process of performing the smelting includes: in a charging period of the 1-3 dephosphorization electric arc furnaces, adding the full-scrap steel for the smelting, lime, slag in the decarbonization electric arc furnace, auxiliary materials and carbon powder or a carbon block into the dephosphorization electric arc furnace.

3 Claims, 1 Drawing Sheet

(51) Int. Cl.
    *C21C 5/56*     (2006.01)
    *C21C 5/30*     (2006.01)
    *C21C 7/068*     (2006.01)
    *C21C 7/00*     (2006.01)

(52) U.S. Cl.
    CPC ............ *C21C 5/5252* (2013.01); *C21C 5/562* (2013.01); *C21C 7/0025* (2013.01); *C21C 7/0037* (2013.01); *C21C 7/068* (2013.01); C21C 2005/5276 (2013.01); C21C 2007/0093 (2013.01)

(56) References Cited

FOREIGN PATENT DOCUMENTS

| | | | | |
|---|---|---|---|---|
| CN | 100475979 C | * | 4/2009 | ............ Y02P 10/216 |
| CN | 102268509 A | | 12/2011 | |
| CN | 104774996 A | | 7/2015 | |
| CN | 105219918 A | * | 9/2015 | ............ Y02P 10/216 |
| EP | 0152674 A1 | | 8/1985 | |
| EP | 1262567 A2 | | 12/2002 | |
| GB | 1141560 A | | 1/1969 | |
| JP | S60174812 A | | 9/1985 | |
| KR | 2017019530 A | * | 2/2017 | ............ Y02P 10/212 |
| KR | 20170019530 A | | 2/2017 | |

OTHER PUBLICATIONS

CN 100475979 C Machine Translation of the Description (Year: 2009).*
CN 105219918 A Machine Translation of the Description (Year: 2015).*
Yi et al. "An overview of utilization of steel slag." Procedia Environmental Sciences. vol. 16, pp. 791-801. (Year: 2012).*
Sun Liguo, et al., Application of USTB Furnace Wall Oxygen Injection Technology for EAF Steelmaking at Fushun Special Steel, Special Steel, Mar. 2005, pp. 41-42, vol. 26, No. 2.

* cited by examiner

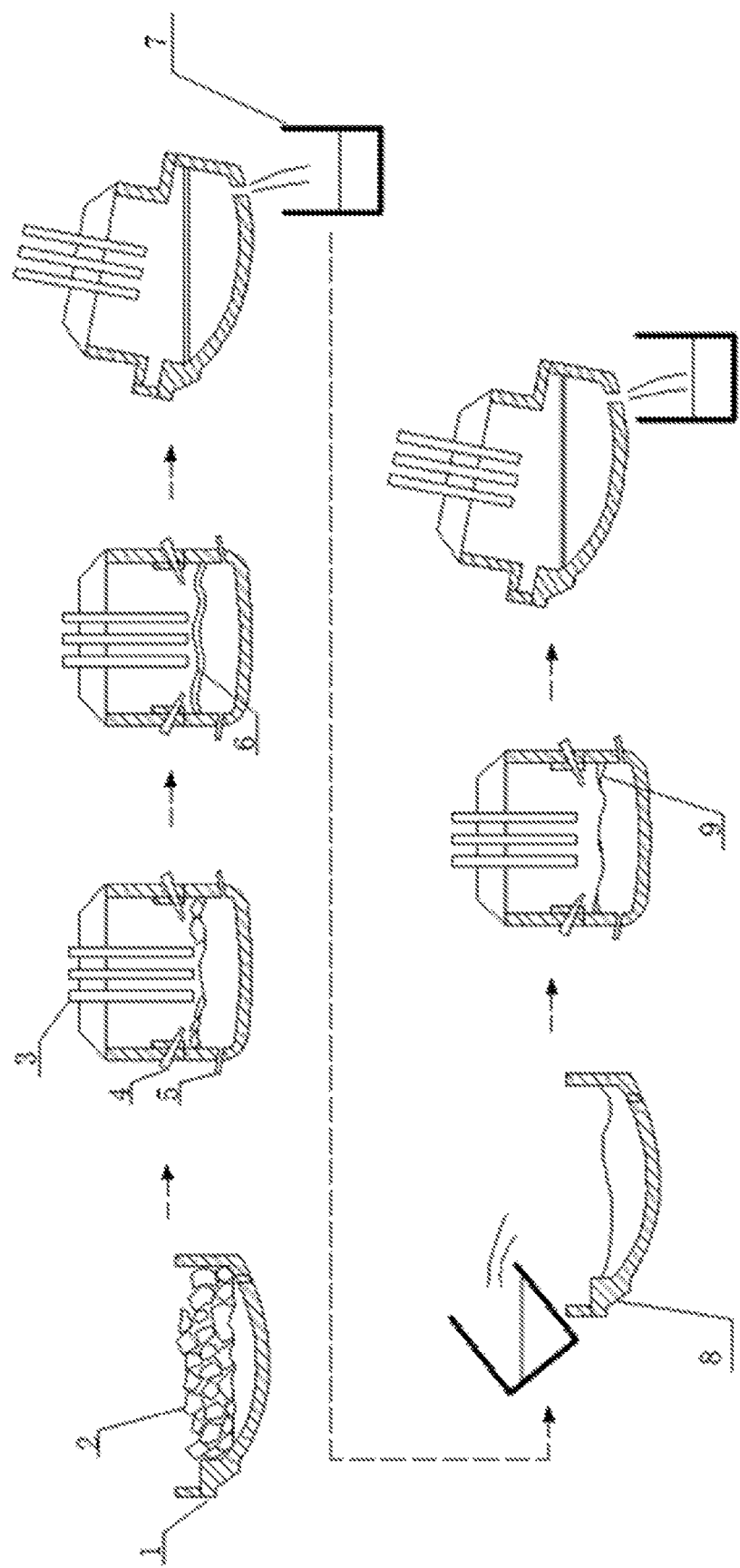

PRODUCTION METHOD FOR SMELTING CLEAN STEEL FROM FULL-SCRAP STEEL USING DUPLEX ELECTRIC ARC FURNACES

CROSS-REFERENCE TO RELATED APPLICATIONS

This application is a continuation of the International Patent Application No. PCT/CN2017/107291 with a filing date of Oct. 23, 2017, designating the United States, now pending, and further claims priority to Chinese Patent Application No. 201710456056.1 with a filing date of Jun. 16, 2017. The content of the aforementioned applications, including any intervening amendments thereto, are incorporated herein by reference.

TECHNICAL FIELD

The present disclosure belongs to the field of electric arc furnace steelmaking, especially relates to a production method for smelting clean steel from full-scrap steel using duplex electric arc furnaces.

BACKGROUND

Full-scrap steel is used as raw material for smelting in electric arc furnace. Dephosphorization operation is one of the extremely important process in the smelting process of electric arc furnaces for full-scrap steel. In the process of dephosphorization in the electric arc furnace for full-scrap steel, due to the high melting point of the scrap steel, the temperature of the furnace hearth must be kept high to ensure that the scrap steel is completely melted down, which results in difficulty in carrying out dephosphorization reaction in the molten steel. In order to solve this problem, smelting in conventional electric arc furnaces for full-scrap steel mainly adopts the way of repeatedly slagging, and adopts automatic operation of flowing slag out of the furnace door. However, due to the fact that a previous batch of slag can not be discharged thoroughly prior to forming new dephosphorization slag everytime, the dephosphorization efficiency of slag decreases significantly, and deep dephosphorization of the molten steel is particularly difficult. "Rephosphorization" phenomenon is very serious with the rise of temperature of the molten steel in later period of smelting. Meanwhile iron loss in the molten steel is very large in the process of repeatedly slagging, leading to severe resource waste and significant increase in production costs.

In the smelting process of electric arc furnaces for full-scrap steel, the degassing and decontamination process also can not be ignored. Due to the low carbon content in the molten steel after the scrap steel in the electric arc furnaces for full-scrap steel is melted down, the number of bubbles in the molten steel is obviously insufficient during the decarburization period, which can not deeply remove the [N], [H] and impurities in the molten steel, resulting in the high content of [N], [H] and impurities in the molten steel of electric arc furnaces for full-scrap steel. To compensate for lack of carbon content in molten steel, the way of adding a certain proportion of carbon-containing iron block in the scrap steel is mainly adopted in the conventional smelting of the electric arc furnaces for full-scrap to try to improve the carbon content of molten steel. But because the carbon content in iron block is not high, it is still unable to solve the problem of low carbon content of molten steel, resulting in difficulty in producing clean steel using electric arc furnaces for full-scrap steel.

SUMMARY

For the above problems, the disclosure provides a production method for smelting clean steel from full-scrap steel using duplex electric arc furnaces, which can solve the problem of unable to dephosphorize deeply during the smelting process of electric arc furnace, meanwhile adding carbon powder into molten steel in earlier stage of smelting to enable the molten steel to recarburize, and carbon oxygen reaction in later stage of smelting making a large number of bubbles generated in molten steel, which can deeply remove [N], [H] and impurities in molten steel, making the molten steel having high cleanliness.

The following technical schemes are implemented in the present disclosure:

A production method for smelting clean steel from full-scrap steel using duplex electric arc furnaces, which makes electric arc furnaces located in two positions be connected in series, wherein the electric arc furnace in a first position is dephosphorization electric arc furnace, and the electric arc furnace in a second position is decarbonization electric arc furnace. The dephosphorization electric arc furnace can make the scrap steel be dephosphorized and recarburized after melted down, and the decarbonization electric arc furnace can make the molten steel deeply dephosphorized, decarbonized, degassed and decontaminated. The scrap steel is added into the dephosphorization electric arc furnace while the carbon material is added into the furnace hearth, to reduce the melting point of the scrap steel and the temperature of the furnace hearth and increase the carbon content of the molten steel. At the end of the dephosphorization period, outputting steel from bottom of eccentric furnace and adopting steel reserve operation to ensure the separation of slag and steel after the dephosphorization process is finished. The molten steel is poured into the decarburization electric arc furnace through steel ladle, slags are continuously formed in decarburization electric arc furnace to deep dephosphorization. Slags in the decarbonization electric arc furnace can also return back to dephosphorization electric arc furnace for continuing use. During decarburization period, the operation of carbon boil is conducted by utilizing the amount of recarburization and injecting oxygen into the molten steel, [N], [H] and impurities in molten steel can be deeply removed by generated CO bubbles, making the molten steel having high cleanliness.

Smelting is conducted by combining 1 decarbonization electric arc furnace and 1-3 dephosphorization electric arc furnaces. The specific process is as follows:

(1) a charging period of dephosphorization electric arc furnace: adding scrap steel for smelting, lime, slag in the decarbonization electric arc furnace, auxiliary material and carbon powder (or block) into the dephosphorization electric arc furnace;

wherein, the scrap steel is brought into the furnace using any one or several ways of continuous charging, shaft charging and basket charging; the lime, the slag in the decarburization electric arc furnace, the auxiliary material and the scrap steel are all added into the dephosphorization electric arc furnace; an amount of addition of the lime is 0-50 kg per ton of steel; an amount of addition of the slag in the decarburization electric arc furnace is 0-50 kg per ton of steel; the carbon powder or carbon block is added into furnace hearth through a charging bin, and an amount for adding or injecting the carbon block or carbon powder is 0-200 kg per ton of steel.

(2) a melting period of the scrap steel: melting scrap steel through power-on and switching furnace wall cluster oxygen lance to the burner mode, to increase the temperature in the furnace hearth to melt the scrap steel; meanwhile injecting high speed powder-air flow of carrier gas and carbon powder to an interior of molten steel by submerged spray lance to reduce melting point of the scrap steel; controlling the time of the melting period of the scrap steel within 10-150 min, then entering dephosphorization period once the scrap steel is melted down;

wherein, for the furnace wall cluster oxygen lance in the burner mode, a main oxygen flow rate is 100-2000 $Nm^3/h$, a gas flow rate is 50-1000 $Nm^3/h$, and an epoxy flow rate is 50-1000 Nm3/h; for the submerged spray lance, the carrier gas and seam protection gas is any one of nitrogen, gas, carbon dioxide, or a mixture gas of any two of the three; a flow rate for the carrier gas is 50-1000 $Nm^3/h$, an injection rate of the carbon powder is 0-200 kg/min, a flow rate of injecting protection gas is 10-1000 $Nm^3/h$, and a particle diameter of the carbon powder is 15 μm-3.0 mm.

dephosphorization period: according to process requirement, forming slag to dephosphorization quickly using characteristics of the furnace hearth having low temperature in earlier stage of smelting; switching the furnace wall cluster oxygen lance to an oxygen supply model to form foam slag; continuing by the submerged lance the operation of injecting carbon powder, and controlling temperature in the furnace at 1530-1580° C.; adopting automatic operation of flowing slag out of the furnace door, meanwhile adding the lime into the furnace in middle stage of dephosphorization smelting to control basicity of the slag at 2.5-3.5;

wherein, for the furnace wall cluster oxygen lance in the oxygen supply mode, the main oxygen flow rate is 50-2000 $Nm^3/h$, the gas flow rate is 50-1000 $Nm^3/h$, and the epoxy flow rate is 50-1000 $Nm^3/h$; for the submerged spray lance, the injection rate of the carbon powder is 0-200 kg/min, and the amount of addition of the lime is 5-50 kg per ton of steel.

terminal output of dephosphorization electric arc furnace to inside of semisteel ladle: sampling molten steel to measure phosphorus content and carbon content in later stage of smelting in the dephosphorization electric arc furnace, outputting steel from bottom of eccentric furnace when a predetermine standard for steel is satisfied, and adopting steel reserve operation to prevent dephosphorization oxidation slag from entering into the decarbonization electric arc furnace;

wherein, the smelting time of the dephosphorization electric arc furnace is controlled at 60-120 min; after the dephosphorization process is finished, the carbon content in the molten steel is controlled between 0.4%-2% (mass percent), the phosphorus content in the molten steel is controlled below 0.010%, the tapping temperature is greater than 1540° C., and the remaining steel in the furnace is 10%-30% of the total molten steel.

a charging period of the decarbonization electric arc furnace: adding the molten steel in the semisteel ladle into the decarburization electric arc furnace, and adding the lime and auxiliary materials into the decarburization electric arc furnace;

wherein, the molten steel is added into the furnace as charging by ways of furnace door, charging tank of the furnace wall or unscrewing furnace cover; if special circumstance occurs in the process of entering into the furnace, leading the molten steel cannot enter into the furnace, molten steel will be directly cast to steel blocks for use; the amount of addition of the lime in the furnace is 5-50 kg per ton of steel.

(6) a period of decarbonization degassing: detecting a temperature of molten steel after it entered into the furnace; calculating oxygen consumption and power consumption during decarbonization by calculating modules and in combination of predetermined tapping temperature for the molten steel and carbon content; forming slag continuously in decarburization electric arc furnace, and enabling the basicity of slag being 2-3.5; injecting by the furnace wall oxygen lance and the submerged spray lance oxygen to interior of the molten steel according to the results of calculation and process requirements, meanwhile blowing argon (or carbon dioxide) from the bottom and stirring; deeply removing [N], [H] and impurities in molten steel through stirring the bubbles generated with carbon-oxygen reaction, argon, or carbon dioxide in the process of floatation;

wherein, the oxygen supply flow rate of the furnace wall cluster oxygen lance is 50-3000 $Nm^3/h$, the oxygen supply flow rate of the submerged spray lance is 50-2000 $Nm^3/h$, the gas flow rate is 50-1000 $Nm^3/h$, a flow rate for blowing argon (or carbon dioxide) from the bottom is 1-100 NL/min, a power-on time for electrodes is 0-100 min, and a converting time is 10-100 min.

(7) end point control of decarbonization electric arc furnace: sampling molten steel to measure phosphorus content, carbon content and temperature of molten steel in later stage of smelting, outputting steel once reaching the process requirements, and adopting steel reserve operation to prevent slag from entering into the molten steel, and controlling tapping temperature of molten steel at 1550-1700° C.;

wherein, the carbon content of molten steel is controlled above 0.1% (mass percent) after the decarburization process is finished (except for ultra-low carbon steel); the phosphorus content of molten steel is controlled below 0.003%; the remaining steel in the furnace is 10%-30% of the total molten steel; slags discharged from the decarbonization electric arc furnace return back to dephosphorization electric arc furnace for continuing use.

Further, this method is suitable to the smelting process of duplex electric arc furnaces for full-scrap steel of 30-250 T.

Further, the capacities of the dephosphorization electric arc furnace plus the decarburization electric arc furnace are same as the capacity of conventional electric arc furnace, but a quality of molten steel produced thereof reaches a standard of clean steel, i.e., [Cu]+[Ti]+[Pb]<0.01%, [P]<30 ppm, [N]<40 ppm, and so on.

Further, the production method of dephosphorization electric arc furnace plus decarbonization electric arc furnace adapted has lower ferrous charges consumption and auxiliary materials consumption than materials consumption of the conventional electric arc furnace.

The beneficial technical effects of the disclosure are as follows:

The method of the disclosure can actualize smelting clean steel from full-scrap steel using duplex electric arc furnaces. The dephosphorization process and the decarbonization process are conducted in two electric arc furnaces by serieswound electric arc furnaces, and carbon material is added into the molten steel in earlier stage of smelting to reduce the melting point of the scrap steel and the temperature of the furnace hearth, which effectively improve the efficiency of dephosphorization. After the end of dephosphorization period, the separation of slag steel can be completely realized by outputting steel from bottom of eccentric furnace, avoiding slag in the dephosphorization electric arc furnace to be brought into the decarburization electric arc furnace. Reforming slag to deep dephosphorization in decarburization electric arc furnace, meanwhile injecting oxygen to conduct decarburization reaction to remove [N], [H] and impurities in molten steel. The mass fraction of phosphorus in molten steel can be controlled below $30*10^{-6}$, and the mass fraction of nitrogen in molten steel can be controlled below $60*10^{-6}$, with the lowest to $30*10^{-6}$. This method can greatly improve the cleanliness of molten steel and improve the quality of the product.

BRIEF DESCRIPTION OF THE DRAWINGS

FIG. 1 is a flow chart of the process for smelting clean steel from full-scrap steel using duplex electric arc furnaces; reference signs: 1. dephosphorization electric arc furnace, 2. scrap steel, 3. electrode, 4. furnace wall cluster oxygen lance, 5. submerged spray lance, 6. slag in the dephosphorization electric arc furnace, 7. steel ladle, 8. decarburization electric arc furnace, 9. slag in the decarbonization electric arc furnace.

DETAILED DESCRIPTION

In order to make the purpose, the technical scheme and the advantages of this disclosure more clear, the following detailed description of the disclosure is carried out in combination with the accompanying drawings and the examples of implementation. It should be understood that the specific embodiments described here are only used to explain the disclosure and not used to limit the disclosure.

In contrast, the disclosure covers any alternative, modification, equivalent method, and scheme in the essence and scope of the disclosure defined by the claim. Further, in order to make the public better understand the disclosure, the details of the disclosure are described in detail below and some specific details are described in detail. The present disclosure can be fully understood by those of skill in the art without the description of these details.

Embodiment 1

In this embodiment, the method is applied for smelting clean steel using duplex electric arc furnaces of 50 t plus 50 t. The specific methods are as follows:

(1) a charging period of dephosphorization electric arc furnace: adding scrap steel for smelting, lime, slag in the decarbonization electric arc furnace, auxiliary material and carbon powder into the dephosphorization electric arc furnace.

wherein, the scrap steel is brought into the furnace using the way of basket charging (or continuous charging); the lime, the slag in the decarburization electric arc furnace, the auxiliary material and the scrap steel are all added into the dephosphorization electric arc furnace; an amount of addition of the lime is 15 kg per ton of steel; an amount of addition of the slag in the decarburization electric arc furnace is 5 kg per ton of steel; the carbon powder is added into furnace hearth through a charging bin, an amount of addition of the carbon powder is 30 kg per ton of steel, and a particle diameter of the carbon powder is 600 μm.

a melting period of the scrap steel: melting scrap steel through power-on and switching furnace wall cluster oxygen lance to the burner mode, to increase the temperature in the furnace hearth to melt the scrap steel, then entering dephosphorization period once the scrap steel is melted down.

wherein, for the furnace wall cluster oxygen lance in the burner mode, a main oxygen flow rate is 100-800 Nm³/h, a gas flow rate is 50-400 Nm³/h, and an epoxy flow rate is 50-300 Nm³/h.

(3) dephosphorization period: according to process requirement, forming slag to dephosphorization quickly using characteristics of the furnace hearth having low temperature in earlier stage of smelting; switching the furnace wall cluster oxygen lance to an oxygen supply model to form foam slag; controlling temperature in the furnace at 1530-1580° C.; adopting automatic operation of flowing slag out of the furnace door, meanwhile adding the lime into the furnace in middle stage of dephosphorization smelting to control basicity of the slag at 2.5-3.5.

wherein, an amount of addition of the lime is 10 kg per ton of steel; for the furnace wall cluster oxygen lance in the oxygen supply mode, the main oxygen flow rate is 1000-1500 Nm³/h, the gas flow rate is 100-150 Nm³/h, and the epoxy flow rate is 100-200 Nm³/h.

(4) terminal output of dephosphorization electric arc furnace: sampling molten steel to measure phosphorus content and carbon content in later stage of smelting in the dephosphorization electric arc furnace, outputting steel from bottom of eccentric furnace when a predetermine standard for steel is satisfied, and adopting steel reserve operation to prevent dephosphorization oxidation slag from entering into the decarbonization electric arc furnace; the smelting time of the dephosphorization electric arc furnace is controlled at 80 min.

wherein, after the dephosphorization process is finished, the carbon content in the molten steel is controlled between 1.8%-2.0% (mass percent), the phosphorus content in the molten steel is controlled below 0.008%, the tapping temperature is not less than 1560° C., and the remaining steel in the furnace is 20% of the total molten steel.

(5) a charging period of the decarbonization electric arc furnace: adding the molten steel in the semisteel ladle into the decarburization electric arc furnace, and adding the lime and auxiliary materials into the decarburization electric arc furnace;

wherein, the molten steel is added into the furnace as charging by ways of unscrewing furnace cover; the amount of addition of the lime in the furnace is 10 kg per ton of steel.

a period of decarbonization degassing: detecting a temperature of molten steel after it entered into the furnace; calculating oxygen consumption and power consumption during decarbonization by calculating modules and in combination of predetermined tapping temperature for the molten steel and carbon content; forming slag continuously in decarburization electric arc furnace, and enabling the basicity of slag being 2-3.5; injecting by the furnace wall oxygen lance and the submerged spray lance oxygen to interior of the molten steel according to the results of calculation and process requirements, meanwhile blowing argon (or carbon dioxide) from the bottom and stirring; deeply removing [N], [H] and impurities in molten steel through stirring the bubbles generated with carbon-oxygen reaction, argon, or carbon dioxide in the process of floatation;

wherein, the oxygen supply flow rate of the furnace wall cluster oxygen lance is 1200-2000 Nm³/h, the gas flow rate is 100-200 Nm³/h, the oxygen supply flow rate of the submerged spray lance is 400-600 Nm³/h, a flow rate for blowing argon (or carbon dioxide) from the bottom is 30-50 NL/min.

end point control of decarbonization electric arc furnace: sampling molten steel to measure phosphorus content, carbon content and temperature of molten steel in later stage of smelting, outputting steel once reaching the process requirements, and adopting steel reserve operation to prevent slag from entering into the molten steel, and controlling tapping temperature of molten steel at 1630-1650° C.

wherein, the carbon content of molten steel is controlled above 0.1% (mass percent) after the decarburization process is finished; the phosphorus content of molten steel is controlled below 0.003%; the remaining steel in the furnace is 20% of the total molten steel; slags discharged from the decarbonization electric arc furnace return back to dephosphorization electric arc furnace for continuing use.

After adopting the method described in the present disclosure, the phosphorus content of molten steel of smelting in electric arc furnace is is less than 0.003% (mass percent), the nitrogen content of molten steel is controlled below 0.006% (mass percent), [Cu]+[Ti]+[Pb]<0.01% (mass percent), and the power consumption is 350 KW·h per ton of steel, so the cleanliness of molten steel is improved significantly.

Embodiment 2

In this embodiment, the method is applied for smelting clean steel using duplex electric arc furnaces of 100 t plus 100 t. The specific methods are as follows:

(1) a charging period of dephosphorization electric arc furnace: adding scrap steel for smelting, lime, slag in the decarbonization electric arc furnace and auxiliary material into the dephosphorization electric arc furnace.

wherein, the scrap steel is brought into the furnace using the way of continuous charging; the lime, the slag in the decarburization electric arc furnace, the auxiliary material and the scrap steel are all added into the dephosphorization electric arc furnace; an amount of addition of the lime is 10 kg per ton of steel; an amount of addition of the slag in the decarburization electric arc furnace is 5 kg per ton of steel.

(2) a melting period of the scrap steel: melting scrap steel through power-on and switching furnace wall cluster oxygen lance to the burner mode, to increase the temperature in the furnace hearth to melt the scrap steel; meanwhile injecting high speed powder-air flow of carrier gas and carbon powder to an interior of molten steel by submerged spray lance to reduce melting point of the scrap steel; then entering dephosphorization period once the scrap steel is melted down.

wherein, for the furnace wall cluster oxygen lance in the burner mode, a main oxygen flow rate is 200-1000 $Nm^3/h$, a gas flow rate is 50-400 $Nm^3/h$, and an epoxy flow rate is 50-300 $Nm^3/h$; for the submerged spray lance, the carrier gas and seam protection gas is nitrogen; a flow rate for the carrier gas is 500-600 $Nm^3/h$, an injection rate of the carbon powder is 20 kg/min, a flow rate of injecting protection gas is 100 $Nm^3/h$, and a particle diameter of the carbon powder is 600 μm.

(3) dephosphorization period: according to process requirement, forming slag to dephosphorization quickly using characteristics of the furnace hearth having low temperature in earlier stage of smelting; switching the furnace wall cluster oxygen lance to an oxygen supply model to form foam slag; continuing by the submerged lance the operation of injecting carbon powder, and controlling temperature in the furnace at 1540-1560° C.; adopting automatic operation of flowing slag out of the furnace door, meanwhile adding the lime into the furnace in middle stage of dephosphorization smelting to control basicity of the slag at 2.5-3.5;

wherein, for the furnace wall cluster oxygen lance in the oxygen supply mode, the main oxygen flow rate is 1200-1500 $Nm^3/h$, the gas flow rate is 150-250 $Nm^3/h$, and the epoxy flow rate is 100-300 $Nm^3/h$; for the submerged spray lance, the injection rate of the carbon powder is 20 kg/min, the amount of injection of the carbon powder in the dephosphorization electric arc furnace is 30 kg, and the amount of addition of the lime is 15 kg per ton of steel.

(4) terminal output of dephosphorization electric arc furnace: sampling molten steel to measure phosphorus content and carbon content in later stage of smelting in the dephosphorization electric arc furnace, outputting steel from bottom of eccentric furnace when a predetermine standard for steel is satisfied, and adopting steel reserve operation to prevent dephosphorization oxidation slag from entering into the decarbonization electric arc furnace;

wherein, the smelting time of the dephosphorization electric arc furnace is controlled at 90 min; after the dephosphorization process is finished, the carbon content in the molten steel is controlled between 1.5%-1.8% (mass percent), the phosphorus content in the molten steel is controlled below 0.010%, the tapping temperature is greater than 1540° C., and the remaining steel in the furnace is 10%-30% of the total molten steel.

(5) a charging period of the decarbonization electric arc furnace: adding the molten steel in the steel ladle into the decarburization electric arc furnace, and adding the lime and auxiliary materials into the decarburization electric arc furnace.

wherein, the molten steel is added into the furnace as charging by ways of charging tank of furnace door; the amount of addition of the lime in the furnace is 10 kg per ton of steel;

(6) a period of decarbonization degassing: detecting a temperature of molten steel after it entered into the furnace; calculating oxygen consumption and power consumption during decarbonization by calculating modules and in combination of predetermined tapping temperature for the molten steel and carbon content; forming slag continuously in decarburization electric arc furnace, and enabling the basicity of slag being 2-3.5; injecting by the furnace wall oxygen lance and the submerged spray lance oxygen to interior of the molten steel according to the results of calculation and process requirements, meanwhile blowing argon (or carbon dioxide) from the bottom and stirring; deeply removing [N], [H] and impurities in molten steel through stirring the bubbles generated with carbon-oxygen reaction, argon, or carbon dioxide in the process of floatation;

wherein, the oxygen supply flow rate of the furnace wall cluster oxygen lance is 1200-2000 $Nm^3/h$, the gas flow rate is 100-200 $Nm^3/h$, the oxygen supply flow rate of the submerged spray lance is 400-600 $Nm^3/h$, a flow rate for blowing argon (or carbon dioxide) from the bottom is 30-50 NL/min.

(7) end point control of decarbonization electric arc furnace: sampling molten steel to measure phosphorus content, carbon content and temperature of molten steel in later stage of smelting, outputting steel once reaching the process requirements, and adopting steel reserve operation to prevent slag from entering into the molten steel, and controlling tapping temperature of molten steel at 1630-1650° C.

wherein, the carbon content of molten steel is controlled above 0.1% (mass percent) after the decarburization process is finished; the phosphorus content of molten steel is controlled below 0.003%; the remaining steel in the furnace is 30% of the total molten steel; slags discharged from the decarbonization electric arc furnace return back to dephosphorization electric arc furnace for continuing use.

After adopting the method described in the present disclosure, the phosphorus content of molten steel for smelting in electric arc furnace is not more than 0.003% (mass percent), the nitrogen content of molten steel is controlled below 0.005% (mass percent), [Cu]+[Ti]+[Pb]<0.01% (mass percent), and the power consumption is below 340 KW·h per ton of steel, so the cleanliness of molten steel is improved significantly.

What is claimed is:

1. A production method for smelting clean steel from full-scrap steel using duplex electric arc furnaces, comprising: performing smelting by combining a decarbonization electric arc furnace and 1-3 dephosphorization electric arc furnaces, a specific process of performing the smelting comprises:
   (1) in a charging period of the 1-3 dephosphorization electric are furnaces, adding the full-scrap steel for the smelting, lime, slag in the decarbonization electric arc furnace, auxiliary materials and carbon powder or a carbon block into the dephosphorization electric arc furnace;
   wherein, the full-scrap steel is brought into the dephosphorization electric are furnace using any one or several ways selected from the group consisting of continuous charging, shaft charging and basket charging; the lime, the slag in the decarburization electric arc furnace, the auxiliary materials and the full-scrap steel are all added into the 1-3 dephosphorization electric arc furnaces; an amount of addition of the lime is 0-50 kg per ton of steel; an amount of addition of the slag in the decarburization electric arc furnace is 0-50 kg per ton of steel; the carbon powder or the carbon block is added into a furnace hearth of the dephosphorization electric arc furnace through a charging bin, and an amount for adding or injecting the carbon block or the carbon powder is 0-200 kg per ton of steel;
   (2) in a melting period of the full-scrap steel, melting the full-scrap steel in the dephosphorization electric arc furnace through power-on and switching a furnace wall cluster oxygen lance to a burner mode, to increase a temperature in the furnace hearth to melt the full-scrap steel; injecting powder-air flow of a carrier gas and the carbon powder to an interior of molten steel by a submerged spray lance to reduce a melting point of the full-scrap steel; controlling a time of the melting period of the full-scrap steel within 10-150 min, and entering a dephosphorization period once the full-scrap steel is melted down;
   wherein, the furnace wall cluster oxygen lance in the burner mode has a first main oxygen flow rate of 100-2000 Nm$^3$/h, a first gas flow rate of 50-1000 Nm$^3$/h, and a first epoxy flow rate of 50-1000 Nm$^3$/h: the carrier gas and a seam protection gas of the submerged spray lance are both any one selected from the group consisting of nitrogen, a fuel gas, carbon dioxide, and a mixture gas of any two of the nitrogen, the fuel gas, and carbon dioxide; a flow rate of the carrier gas is 50-1000 Nm$^3$/h, an injection rate of the carbon powder is 0-200 kg/min, a flow rate of injecting the seam protection gas is 10-1000 Nm$^3$/h, and a particle diameter of the carbon powder is 15 μm-3.0 mm;
   (3) in the dephosphorization period in the dephosphorization electric arc furnace, forming the slag to perform dephosphorization using characteristics of the furnace hearth in an earlier stage of the smelting; switching the furnace wall cluster oxygen lance to oxygen supply mode to form foam slag; continuing to inject the carbon powder by the submerged spray lance, and controlling a temperature in the decarburization electric arc furnace at 1530-1580° C.; adopting an automatic operation of flowing the slag out of a furnace door, and adding the lime into the decarburization electric arc furnace in a middle stage of the smelting to control basicity of the slag at 2.5-3.5;
   wherein, the furnace wall cluster oxygen lance in the oxygen supply mode has a second main oxygen flow rate of 50-2000 Nm$^3$/h, a second gas flow rate of 50-1000 Nm$^3$/h, and a second epoxy flow rate of 50-1000 Nm$^3$/h the injection rate of the carbon powder of the submerged spray lance is 0-200 kg/min, and the amount of addition of the lime is 5-50 kg per ton of steel;
   (4) performing a terminal output of the 1-3 dephosphorization electric arc furnaces to an inside of a semisteel ladle, comprising the following steps: sampling the molten steel to measure a phosphorus content and a carbon content in a later stage of the smelting in the 1-3 dephosphorization electric arc furnaces, outputting steel from a bottom of an eccentric furnace when a predetermined standard for the steel is satisfied, and adopting a steel reserve operation to prevent dephosphorization oxidation slag from entering into the decarbonization electric arc furnace;
   wherein, a smelting time of the 1-3 dephosphorization electric arc furnaces is controlled at 60-120 min; after a dephosphorization process is finished, the carbon content in the molten steel is controlled between 0.4%-2_wt %, the phosphorus content in the molten steel is controlled below 0.010%, a tapping temperature is greater than 1540° C., and remaining steel in the 1-3 dephosphorization electric arc furnaces is 10%-30% of the total amount of the molten steel;
   (5) in a charging period of the decarbonization electric arc furnace, adding the molten steel in the semisteel ladle into the decarburization electric arc furnace, and adding the lime and the auxiliary materials into the decarburization electric arc furnace;
   wherein, the molten steel is added into the decarbonization electric arc furnace for charging by ways of a furnace door, a charging tank of a furnace wall or unscrewing a furnace cover; if a special circumstance occurs in a process of entering into the decarbonization electric arc furnace, and the molten steel fails to enter into the furnace, the molten steel is directly cast to steel blocks for use: the amount of addition of the lime in the decarburization electric arc furnace is 2-50 kg per ton of steel;
   (6) in a period of decarbonization degassing, detecting a temperature of the molten steel after the molten steel enters into the decarburization electric arc furnace; calculating an oxygen consumption and a power consumption during decarbonization by calculating modules and in combination of a predetermined tapping temperature for the molten steel and the carbon content: forming the slag continuously in the decarburization electric arc furnace, and controlling the basicity of the slag to be 2-3.5; injecting, by the furnace wall cluster oxygen lance and the submerged spray lance, oxygen to the interior of the molten steel according to results of a calculation, blowing argon from the bottom of the eccentric furnace and stirring carbon dioxide; deeply removing [N], [H] and impurities in the molten steel through stirring bubbles generated by a carbon-oxygen reaction, argon, or carbon dioxide in a process of floatation;

wherein, an oxygen supply flow rate of the furnace wall cluster oxygen lance is 50-3000 $Nm^3/h$, an oxygen supply flow rate of the submerged spray lance is 50-2000 $Nm^3/h$, the second gas flow rate of the furnace wall cluster oxygen lance is 50-1000 $Nm^3/h$, a flow rate for blowing argon or carbon dioxide from the bottom of the eccentric furnace is 1-100 NL/min, a power-on time for electrodes is 0-100 min, and a converting time is 10-100 min;

(7) performing an end point control of the decarbonization electric arc furnace, comprising the following steps: sampling the molten steel to measure the phosphorus content, the carbon content and the temperature of the molten steel in the later stage of the smelting, outputting steel, and adopting the steel reserve operation to prevent the slag from entering into the molten steel, and controlling the tapping temperature of the molten steel at 1550-1700° C.;

wherein, the carbon content of the molten steel is controlled above 0.1 wt % after a decarburization process is finished; the phosphorus content of the molten steel is controlled below 0.003%; the slag discharged from the decarbonization electric arc furnace returns back to the 1-3 dephosphorization electric arc furnaces for continuing use.

2. The production method for smelting the clean steel from the full-scrap steel using the duplex electric arc furnaces according to claim 1, wherein, the production method is suitable to a smelting process of the duplex electric arc furnaces for the full-scrap steel of 30-250 T.

3. The production method for smelting the clean steel from the full-scrap steel using the duplex electric arc furnaces according to claim 1, wherein, capacities of the 1-3 dephosphorization electric arc furnaces plus a capacity of the decarburization electric arc furnace are same as a capacity of a conventional electric arc furnace, and a quality of the molten steel produced by the 1-3 dephosphorization electric arc furnaces and the decarburization electric arc furnace reaches a standard of the clean steel, [Cu]+[Ti]+[Pb] <0.01%, [P]<30 ppm, [N]<40 ppm.

* * * * *